Oct. 7, 1969 A. GABOR 3,471,103

STORAGE TAPE TRANSPORT AND MOTOR CONTROL SYSTEM

Filed Oct. 20, 1965 2 Sheets-Sheet 1

INVENTOR
ANDREW GABOR

BY Lane, Aitken, Dunner & Ziems
ATTORNEYS

Oct. 7, 1969 A. GABOR 3,471,103

STORAGE TAPE TRANSPORT AND MOTOR CONTROL SYSTEM

Filed Oct. 20, 1965 2 Sheets-Sheet 2

INVENTOR
ANDREW GABOR

BY Lane, Aitken, Dunner & Ziems
ATTORNEYS

United States Patent Office 3,471,103
Patented Oct. 7, 1969

3,471,103
STORAGE TAPE TRANSPORT AND MOTOR CONTROL SYSTEM

Andrew Gabor, Huntington, N.Y., assignor to Potter Instruments Company, Inc., Plainview, N.Y., a corporation of New York Filed Oct. 20, 1965, Ser. No. 498,379
Int. Cl. G11b 15/44
U.S. Cl. 242—184 13 Claims

ABSTRACT OF THE DISCLOSURE

The specification discloses a digital information storage tape transport and motor control system which is operable to drive a recording tape reel motor in either of two directions or to electrodynamically bring it to a stop in response to the amount of recording tape in a buffer storage means provided for storing a loop of tape between the reel and the tape feeding capstan. The motor is stopped electrodynamically when the tape loop in the buffer means lies beween the predetermined points by means of motor control circuits which are adapted to be triggered into conduction at this point to apply an external braking voltage to the motor armature.

This invention relates to information storage tape transports and motor control systems used therein, and more particularly to digital tape transports and motor control systems in which the control system is operable to drive a DC motor in one direction or the other or electrodynamically bring it to a stop.

In information storage tape transports, tape is stored on reels and is fed between the reels past a tape processing station where information is read out from or recorded on the tape. When the tape is being recorded upon or read out it is subjected to rapid starting and stopping and fluctuations in speed at the tape processing station. The tape reels being of relatively high inertia cannot respond quickly enough to allow for rapid changes in speed of the tape and accordingly buffer storage devices for storing tape loops are provided between the reels and the tape processing station. A buffer storage device may for example be an elongated chamber in which a loop of tape is held by a vacuum. As the speed of the tape past the tape processing station changes rapidly or fluctuates, the length of the tape loop in the chamber varies to accommodate the rapid changes or fluctuations. The tape reel then responds more slowly to feed tape into or withdraw tape from the buffer storage device to bring the amount of tape in the buffer storage device back near a desired middle point.

In some tape transports of the prior art, the tape reels are controlled by servo-systems, which respond to continuously variable signals indicating the amounts of tape in the buffer storage devices. However, these systems are quite expensive particularly when the buffer storage devices are vacuum chambers because of the difficulty of achieving continuous sensing of the amount of tape in the vacuum chambers. Because of the difficulty and cost of achieving continuous sensing, most of the servo systems controlling the reels in tape transports are of the type which sense discrete points and control the reels in accordance with the position of the tape loops relative to the discrete points. A typical example of such a system drives the tape reel in one direction to feed tape into the vacuum chamber in response to the end of the tape loop in the vacuum chamber being above a first discrete point and drives the tape reel in the opposite direction to withdraw tape from the vacuum chamber in response to the end of the tape loop in the vacuum chamber being below a second discrete point. These systems of the prior art which sense discrete points generally require an electromechanical brake or a tachometer to sense tape velocity in order to have stable operation.

The system of the present invention is of the type which senses discrete points and responds to the position of the tape relative to these discrete points and thus avoids the difficulty and expense of sensing the position of the tape over a continuous range. In the system of the present invention a motor control system responds to the position of the tape relative to discrete points in the buffer storage device to either energize the motor to drive the reel in one direction or the other or electrodynamically brake the motor and thus bring the reel quickly to a stop. The system of the present invention thus eliminates the need for the electromechanical brake or tachometer, which are noisy and have a short life. Moreover the system of the present invention responds more quickly to bring the amount of tape in the buffer storage back near the desired level.

In accordance with the present invention means are provided to detect whether the amount of tape in the buffer storage device is below a predetermined minimum, above a predetermined maximum, or between this minimum and this maximum. The motor control system responds to signals produced by this means to drive the motor in a clockwise or counterclockwise direction or to electrodynamically bring it quickly to a stop. In the motor control system the armature of the motor is connected between a pair of electron valves. When one of the electron valves conducts current flows through the armature in one direction to cause the motor to drive the reel to feed tape into the buffer storage device and when the other of the electron valves is conducting the armature is energized to drive the reel in the opposite direction to withdraw tape from the tape storage device. When it is desired for the reel to come to a stop, signals are applied to the electron valves such that the motor is brought electrodynamically to a stop. In some embodiments both sides of the armature are clamped to ground potential to electrodynamically brake the armature to a stop. In other embodiments voltage from an external source in addition to the back EMF energizes the armature to tend to drive it in the opposite direction from which it is rotating and thus bring the armature quickly to a stop.

Accordingly, an object of the present invention is to provide an improved motor control system of the discrete point sensing tape for driving an information storage tape reel feeding tape into a tape buffer storage in a digital magnetic tape transport.

Another object of the present invention is to provide an improved motor control system which will selectively drive the motor in one direction or the other or electrodynamically bring it to a stop.

A further object of the present invention is to provide a motor control system which will selectively drive the motor in either direction or bring the motor to a stop by energizing it from an external source to drive it in the opposite direction from which it is turning for only as long as the motor is turning in this direction.

A still further object of the present invention is to provide a motor control system of the discrete point sensing type for driving the tape reel of a digial information storage tape transport, which does not employ an electromechanical brake or a tape velocity sensing tachometer.

A still further object of the present invention is to provide a motor control system for driving the tape reel of a digital tape transport containing a tape buffer storage which motor control system responds more quickly to bring the amount of tape in the tape buffer storage back near a desired middle point.

Further objects and advantages of the present invention will become readily apparent as the following detailed description of the invention unfolds and when taken in conjunction with the drawings wherein.

Figure 1:
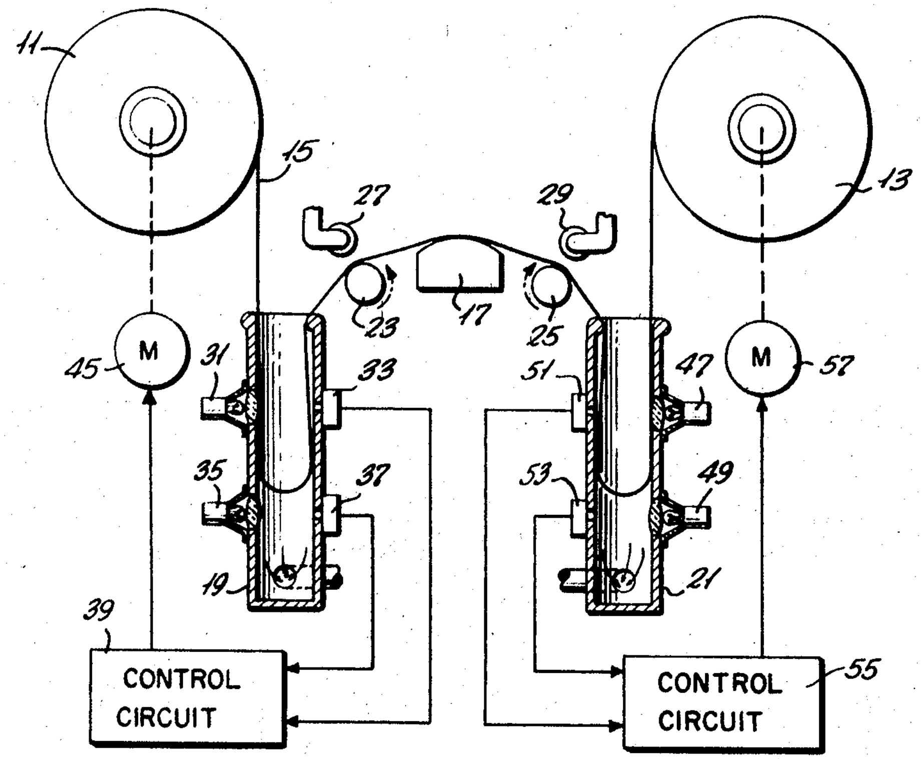
FIG. 1 is a schematic view which illustrates a digital tape transport in accordance with the present invention.

As shown in FIG. 1 the tape transport comprises a pair of tape reels 11 and 13 on which a magnetic information storage tape 15 is wound. The reels 11 and 13 wind and unwind to feed the tape 15 past a tape processing station 17 which is operable to record or read out digital signals from the tape. A capstan 23 rotating in a counterclockwise direction is provided to drive the tape past the tape processing station 17, from right to left as seen in FIG. 1 and a capstan 25 rotating in a clockwise direction is provided to drive the tape past the tape processing station 17, from left to right as seen in FIG. 1. A pinch roller 27 is selectively movable between positions in which it is spaced from the capstan 23 and in which it holds the tape against the capstan 23 to drive the tape from right to left past the tape processing station 17. A pinch roller 29 is selectively movable between a position spaced from the capstan 25 and a position in which it holds the tape against the capstan 25 to drive the tape from left to right past the tape processing station 17.

A tape buffer storage in the form of a vacuum chamber 19 is situated between the reel 11 and the capstan 23. A loop of the tape between the reel 11 and the capstan 23 is formed in the chamber 19 and held taut in the chamber 19 by means of a vacuum. A similar vacuum chamber 21 is situated between the capstan 25 and the reel 13 to hold a loop formed in the tape between the reel 13 and the capstan 25.

About one-third away from the top of the chamber 19 a light source 31 is mounted in the wall of the chamber to shine a beam of light across the chamber 19 to irradiate the photocell 33 mounted in the wall of the chamber 19 at the same level as the light source 31. A light source 35 is mounted in the wall of the chamber 19 about one-third away from the bottom of the chamber to shine a beam of light across the chamber 19 to irradiate a photocell 37, which is mounted in the wall of the chamber 19 at the same level as the light source 35. If the tape loop in the chamber 19 is long enough to be below the light source 31 it will interrupt the beam of light passing from the source 31 to the photocell 33 and if the tape loop is long enough to be below the light source 35 it will interrupt the beam of light passing from the light source 35 to the photocell 37. The signals produced by the photocells 33 and 37 are applied to a motor control circuit 39, which controls the energization of a motor 45. The motor 45 drives the reel 11. The control circuit 39 in response to receiving signals from the photocells 33 and 37 indicating that both the photocells 33 and 37 are irradiated, will energize the motor 45 to drive the reel 11 in a clockwise direction. If both of the photocells 33 and 37 are irradiated, it will means that the end of the tape loop is above the light source 31 and thus a small amount of tape will be stored in the vacuum chamber 19. Accordingly, in response to both photocells 33 and 37 being irradiated, the tape reel will be driven to feed tape into the chamber 19 and lengthen the tape loop stored therein. If neither of the photocells 33 and 37 is irradiated, it will mean that the end of the tape loop in the chamber 19 is below the light source 35. The control circuitry 39 accordingly in response to receiving signals from the photocells 33 and 37 indicating that they are both not irradiated will energize the motor 45 to drive the reel 11 in a counterclockwise direction and thus withdraw the tape from the chamber 19 to shorten the length of the tape loop in the chamber 19. If the logic circuitry 39 receives a signal from the light source 33 indicating that it is not irradiated and receives a signal from the light source 37 indicating that it is irradiated, the end of the tape loop will be between the photocells 33 and 37. In response to receiving such signals from the photocells 33 and 37 the control circuitry 39 will energize the motor 45 in a manner to bring the motor 45 to a stop. In this manner the system of the present invention operates automatically to bring the end of the tape loop into the zone between the photocells 33 and 37 and to stop the rotation of the tape reel when the end of the tape loop is in this zone. Thus the amount of tape in the buffer storage comprising the vacuum chamber 19 is maintained near the desired middle point between the maximum amount that can be put in the chamber 19 and the minimum amount, which is none. The length of the tape loop in the chamber 21 is controlled in the same manner as the tape loop in the chamber 19 by means of light sources 47 and 49 and photocells 51 and 53 mounted in the wall of the chamber 19. The photocells 51 and 53 feed signals to a control circuit 55, which in response to these signals controls the energization of a motor 57. The motor 57 drives the reel 13. The control circuit 55 in response to signals developed by the photocells 51 and 53 controls the energization of the motor 57 to drive the reel 13 in same manner as the control circuit 39 controls the energization of the motor 45, except that the reel 13 is driven counterclockwise in response to both photocells being irradiated and is driven clockwise in response to neither photocell being irradiated.

FIGS. 2 through 5 are circuit diagrams for alternative motor control circuits for the circuit 39. The motor control circuit 55 will be the same as that for the circuit 39 and accordingly the control circuit 55 will not be described in detail.

Figure 2:
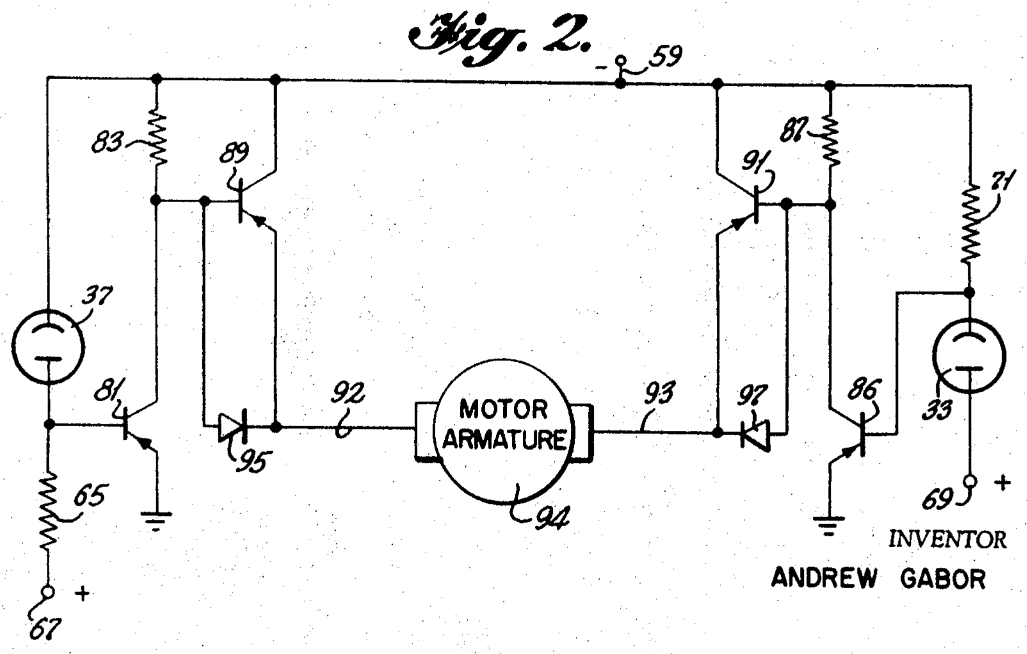
FIG. 2 is a circuit diagram of a motor control system in accordance with the one embodiment of the invention.

As shown in FIG. 2 the cathode of the photocell 37 is connected to a source of negative DC voltage applied at a terminal 59 and the anode of the photocell 37 is connected through a resistor 65 to a source of positive voltage applied at a terminal 67. The anode of the photocell 33 is connected to a source of positive voltage applied at a terminal 69 and the cathode of the photocell 33 is connected through a resistor 71 to the source of negative voltage applied at a terminal 59. Each of the photocells 33 and 37 will have a high impedance when it is not irradiated and it will have a low impedance when it is irradiated. Accordingly the voltage at the anode of the photocell 37 will be positive when the photocell 37 is not irradiated and will be negative when the photocell 37 is irradiated. In addition the voltage at the cathode of the photocell 33 will be negative when the photocell 33 is not irradiated and will be positive when the photocell 33 is irradiated.

The signal voltage produced at the anode of the photocell 37 is applied to the base of an PNP transistor 81, the emitter of which is connected to ground and the collector of which is connected through a resistor 83 to the negative DC voltage applied at a terminal 59. The signal voltage produced at the cathode of the photocell 33 is applied to the base of a PNP transistor 86, the emitter of which is grounded and the collector of which is connected through a resistor 87 to the negative voltage as terminal 59. The collector of the transistor 81 is connected to the base of a PNP transistor 89, the collector of which is connected to the negative voltage applied at terminal 59. The collector of the transistor 86 is connected to the base of a PNP transistor 91, the collector of which is also connected to the negative voltage applied at terminal 59. The emitter of the transistor 89 is connected to one side 92 of the armature 94 of the motor 45 and the emitter of the transistor 91 is connected to the other side 93 of the armature 94. The motor 45 used with the circuit of FIG. 2 has a magnetic field of fixed magnitude as would be provided by a permanent magnet or a field winding connected across a DC source. A rectifying diode 95 is connected between the base of the transistor 89 and the emitter of the transistor 89 and is poled to permit current flow from the base of the transistor 89 to the emitter of the transistor 89. A rectifying diode 97 is connected between the base of the transistor 91 and the emitter of the transistor 91 and is poled to permit current flow from the base of the transistor 91 to the emitter of the transistor 91.

When both of the photocells 33 and 37 are irradiated so that a negative signal voltage is applied to the base of the transistor 81 and a positive signal voltage is applied to the base of the transistor 86, the transistor 81 will be made conductive and the transistor 86 will be cut off. As a result a ground potential will be applied to the base of the transistor 89 whereas a high negative potential near that applied at the terminal 59 will be applied to the base of the transistor 91. Accordingly the transistor 89 will be non-conductive and the transistor 91 will act as an emitter follower. Thus the voltage at the side 93 of the armature 94 will be made negative and will have a value near that of the negative voltage applied at the terminal 59. Current will then flow from ground through the transistor 81, through the diode 95, through the armature 94, and through the transistor 91 to the negative voltage at terminal 59. Current flowing through the armature in this direction will make the motor drive the reel 11 in a clockwise direction. Accordingly the reel 11 will be driven in a clockwise direction to feed tape into the vacuum chamber 19 when the end of the tape loop in chamber 19 is above the photocell 33. When both of the photocells 33 and 37 are not irradiated so that a positive voltage is applied to the base of the tansistor 81 and a negative voltage is applied to the base of the transistor 86, the transistor 86 will be made conductive and the transistor 81 will be cut off. As a result the collector of the transistor 86 will be clamped at ground potential and the collector of the transistor 81 will be near that of the negative voltage applied at the terminal 59. The transistor 89 will accordingly operate as an emitter follower and a negative voltage will be produced at the side 92 of the armature 94 nearly equal to that applied at the terminal 59. Accordingly, current will flow from ground through the transistor 86, through the diode 97, through the armature 94, and through the transistor 89 to the negative voltage applied at the terminal 59. Accordingly the motor will drive the reel 11 in a counterclockwise direction to withdraw the tape from the buffer storage device. Thus whenever the end of the tape loop is below the photocell 37, the reel 11 will be driven in a counterclockwise direction to withdraw tape from the chamber 19.

When the armature of the motor is energized in the manner described above by current flowing in one direction or the other, the back EMF generated by the motor will be applied as a negative voltage to whichever one of the transistors 89 and 91 is conducting. The motor will accelerate until the back EMF becomes more negative than the voltage applied to the base of the transistor, whereupon the transistor will be cut off. The motor will then coast until the back EMF becomes less negative than the base voltage and the transistor again conducts. In this manner the speed of the motor is regulated to value where the back EMF is approximately equal to the voltage applied at terminal 59.

When the end of the tape loop is between the light source 31 and the light source 35, negative signal voltages will be applied to the bases of both the transistors 81 and 86 to make both of these transistors conductive. Accordingly, the bases of both of the transistors 89 and 91 will be clamped at ground potential. If the armature 94 is turning in a clockwise direction, the back EMF generated by the armature will make the side 93 of the armature negative with respect to the side 92. Current flowing through the diode 97 from the collector of the transistor 86 will clamp the side 93 of the armature at ground potential and as a result the back EMF generated by the armature will tend to make the side 92 of the armature positive with respect to ground. Thus the back EMF will tend to make the emitter of the transistor 89 positive with respect to the ground potential applied at the base of the transistor 89. Accordingly the transistor 89 will conduct and operate as an emitter follower to clamp the side 92 to ground and electrodynamic braking will occur. During the electrodynamic braking operation current will flow from ground through the transistor 86, through the diode 97 through the armature of the motor, and through the transistor 89 to the negative power supply applied at terminal 85.

When the armature of the motor reaches zero speed it will no longer generate back EMF and accordingly the transistor 89 will be cut off so that no more current will flow through the armature of the motor.

When the armature of the motor is turning counterclockwise and negative signal voltages are applied to the bases of both of the transistors 81 and 86, as a result of the end of the tape loop being between the photocells 33 and 37, the armature of the motor will be braked to a stop in a similar manner. In the case of counterclockwise rotation, the back EMF will tend to make the side 92 of the armture negative with respect to the side 93 and current flowing through the diode 95 will clamp the side 92 at ground potential. Accordingly the back EMF will tend to make the side 93 of the armature positive with respect to ground and the transistor 91 will operate as an emitter follower to clamp the side 93 to ground. During the resulting electrodynamic braking, current will flow from ground through the transistor 81, through the diode 95, though the armature, and through the transistor 91 to the negative voltage applied at terminal 59.

In this manner the motor control circuit controls the energization of the motor 45 in response to the signals developed by the photocells 33 and 37 to drive the reel 11 clockwise when the end of the tape loop is above the photocell 33, to drive the reel 11 counterclockwise when the end of the tape loop is below the photocell 37, and to brake the reel 11 quickly to a stop when the end of the tape loop is between the photocells 33 and 37.

Figure 3:
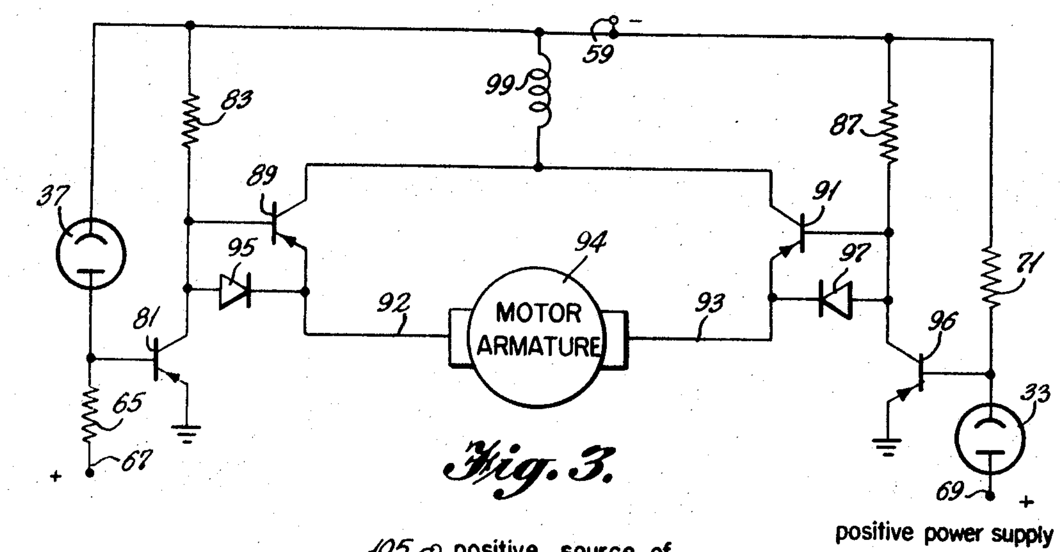
FIG. 3 is a circuit diagram of a motor control system in accordance with another embodiment of the invention.

The embodiment of the motor control circuit illustrated in FIG. 3 is for use with the motor of the type utilizing a field winding to be excited in series with the armature. The circuit of FIG. 3 is the same as that shown in FIG. 2 except that the collectors of the transistors 89 and 91, instead of being connected directly to the negative voltage source applied at terminal 59, are connected to this voltage source through the field winding 99 of the motor 45. The operation of the circuit of FIG. 3 is similar to that of FIG. 2 except that when current is flowing through the armature of the motor, current will also flow through the field winding 99 in series. For example when the motor is being driven in a clockwise direction as a result of the photocells 33 and 37 both being irradiated, current will flow from ground through the transistor 81, through the diode 95, through the armature 94, through the transistor 91, and through the field winding 99 to the negative voltage applied at terminal 59. When the armature of the motor has been accelerated to the point where the back EMF generated by the motor exceeds the voltage applied to the base of the transistor 91 causing the transistor 91 to cut off, this action will not only cut off the current flow through the armature of the motor but will also cut off the current flow through the field winding 99 so that the field winding will not be excited while the motor is coasting back down to a speed where the back EMF is less than the voltage applied to the base of the transistor 91. When the motor is being driven in a counterclockwise direction as a result of the photocells 33 and 37 both not being irradiated, current will flow through the transistor 96, through the diode 97, through the armature 94, through the transistor 89, and through the field winding 99 to the source of negative voltage applied at terminal 59. Thus the motor will operate as a series wound motor when being driven in both directions. When the speed of the motor causes the back EMF generated by the motor to exceed the voltage applied to the base of the transistor 89, the transistor 89 will be cut off and current flow will be cut off through both the armature and the field winding of the motor.

When the photocell 37 is irradiated and the photocell 33 is not irradiated, the sides 92 and 93 of the armature 94 will be clamped at ground potential in the same manner as in the circuit of FIG. 2. If the armature is rotating in a clockwise direction, the transistor 89 will be turned on by the back EMF produced by the armature and current will flow from ground through the transistor 96, through the diode 97, through the armature, through the transistor 89, and through the field winding 99 to the negative voltage source. Accordingly the field will be excited and the armature will be electrodynamically braked to a stop. Since both sides of the armature will be clamped at ground potential, the EMF causing the current flow through the armature of the motor will be essentially the back EMF of the motor and substantially all of the voltage applied at terminal 59 will be applied across the field winding 99. When the armature of the motor comes to a stop current flow through the transistor 89 will be cut off and as a result current flow through both the field winding 99 and the armature of the motor will be cut off.

When the motor is rotating in a counterclockwise direction instead of a clockwise direction the braking action will be essentially the same except that the transistor 91 will be conducting instead of the transistor 89 as a result of the back EMF generated by the motor and the current flow will be through the transistor 81, through the diode 95, through the armature 94, through the transistor 91, and through the field winding 99.

Figure 4:
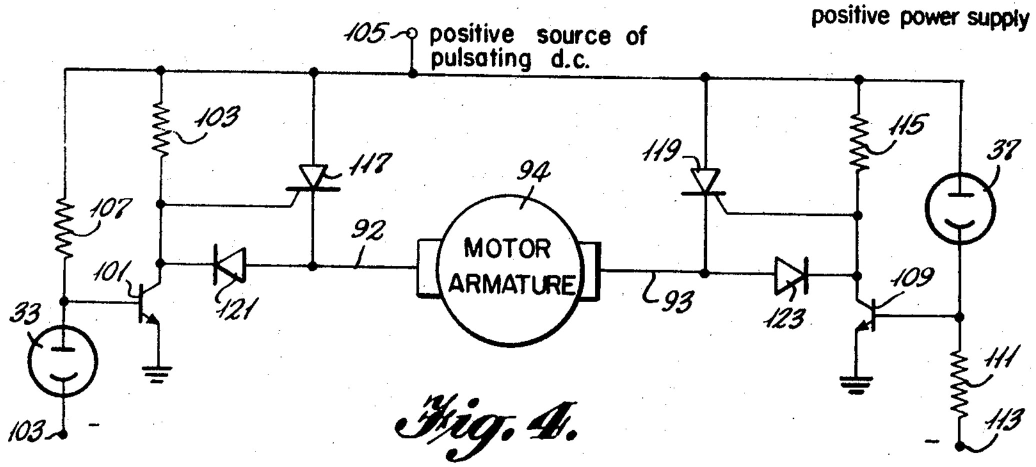
FIG. 4 is a circuit diagram of a motor control system in accordance with still another embodiment of the invention.

The circuit of FIG. 4 is a control circuit making use of silicon controlled rectifiers to control the gating of current through the armature of a motor of the fixed field type. In the circuit of FIG. 4 the anode of the photocell 33 is connected to the base of an NPN transistor 101 and the cathode of the photocell 33 is connected to a terminal 103, to which a negative DC voltage is applied. The emitter of the transistor 101 is connected to ground and the collector of the transistor 101 is connected through a resistor 103 to a terminal 105, to which a source of positive pulsating DC voltage is applied. The terminal 105 is also connected to the base of the transistor 101 through a resistor 107.

The anode of the photocell 37 is connected to the positive source of pulsating DC applied at terminal 105 and the cathode of the photocell 37 is connected to the base of an NPN transistor 109, which is also connected through a resistor 111 to a negative DC voltage applied at a terminal 113. The emitter of the transistor 109 is connected to ground and the collector of the transistor 109 is connected to the terminal 105 through a resistor 115.

The collector of the transistor 101 is connected to the gate of a silicon controlled rectifier 117, the anode of which is connected to the terminal 105 and the cathode of which is connected to the side 92 of the motor armature 94. The collector of the transistor 109 is connected to the gate of a silicon controlled rectifier 119, the anode of which is connected to the terminal 105 and the cathode of which is connected to the side 93 of the motor armature. A rectifying diode 121 is connected between the side 92 of the motor armature and the collector of the transistor 101. The diode 121 is poled to allow current flow from the armature of the motor to the collector of the transistor 101. A rectifying diode 123 is connected between the side 93 of the motor armature and the collector of the transistor 109. The diode 123 is poled to allow current flow from the motor armature to the transistor 109.

In the operation of the circuit of FIG. 4, when the photocell 33 is irradiated, a negative DC voltage will be applied to base of the transistor 101 cutting it off and when the photocell 33 is not irradiated a positive voltage will be applied to the base of the transistor 101 causing it to conduct. When the photocell 37 is irradiated a positive voltage will be applied to the base of the transistor 109 causing it to conduct and when the photocell 37 is not irradiated the voltage at the base of the transistor 109 will be negative so that the transistor 109 is cut off.

Accordingly when the end of the tape loop is above both the photocells 33 and 37 so that both of the photocells are irradiated, the transistor 101 will be cut off and the transistor 109 will conduct. As a result the voltage at the collector of the transistor 109 will be near ground potential so that the silicon controlled rectifier 119 will not conduct. On the other hand, the voltage at the collector of the transistor 101 will be near that of the pulsating DC source applied at terminal 105 and accordingly the silicon controlled rectifier 117 will conduct. As a result current will flow from the terminal 105, through the silicon controlled rectifier 117, through the armature of the motor, through the diode 123 and through the transistor 109 to ground, thus causing the armature to drive the reel 11 in the clockwise direction so as to bring the end of the tape loop back into to zone between the photocells 33 and 37.

When the end of the tape loop is below the photocell 37 so that light to both of the photocells 33 and 37 is cut off, the transistor 101 will be conducting and the transistor 109 will be cut off. As a result the gate of the silicon controlled rectifier 117 will have ground applied thereto and the silicon controlled rectifier 117 will not conduct. The gate of the silicon controlled rectifier 119 on the other hand will have the pulsating positive DC voltage applied thereto from the source 105 and accordingly the silicon controlled rectifier 119 will conduct. As a result current will flow from the source 105 through the silicon controlled rectifier 119, through the armature, through the diode 121, and through the transistor 101 to ground. Accordingly the armature will drive the reel in a counterclockwise direction to bring the end of the tape loop back up above the photocell 37.

When the end of the tape loop is between the photocells 33 and 37, the photocell 37 will be irradiated but the photocell 33 will not. As a result both transistors 101 and 109 will be conducting. If the armature is rotating in a clockwise direction it will be generating a back EMF such as to make the side 92 of the armature positive with respect to the side 93. Current flow through the diode 121 will clamp the side 92 at ground so the side 93 will be made negative, with respect to the ground voltage applied at the gate of the silicon controlled rectifier 119. As a result the silicon controlled rectifier 119 will conduct and current will flow from the terminal 105, through the silicon controlled rectifier 119, through the armature of the motor, through the diode 121, and through the transistor 101 to ground. The direction of current flow through the armature will be in a direction to tend to drive the armature in a counterclockwise direction and accordingly will quickly bring the armature to a stop. The EMF causing the current to flow through the armature in addition to the back EMF generated by the armature will also be the positive source of pulsating DC applied at terminal 105. Accordingly the braking force will be greater than in conventional electrodynamic braking and the armature will very quickly be driven to a stop. As soon as the armature reaches zero speed it will no longer generate back EMF and as a result the side 93 of the armature will not be negative with respect to the gate of the silicon controlled rectifier 119. Accordingly, silicon controlled rectifier 119 will no longer conduct so that the armature will no longer receive current from the source 105 and will not be driven into counterclockwise rotation but will remain at rest. Thus the circuit of FIG. 4 provides a means for positively driving the armature of a motor electrodynamically to a stop with an external source of power without any problem of overshooting the desired zero speed.

When the armature is rotating in a counterclockwise direction, the armature is stopped in a similar manner with the silicon controlled rectifier 117 conducting and current flowing from the source 105, through the silicon controlled rectifier 117, through the armature, through the diode 123, and through the transistor 109 to ground to quickly drive the armature to zero speed.

Figure 5:
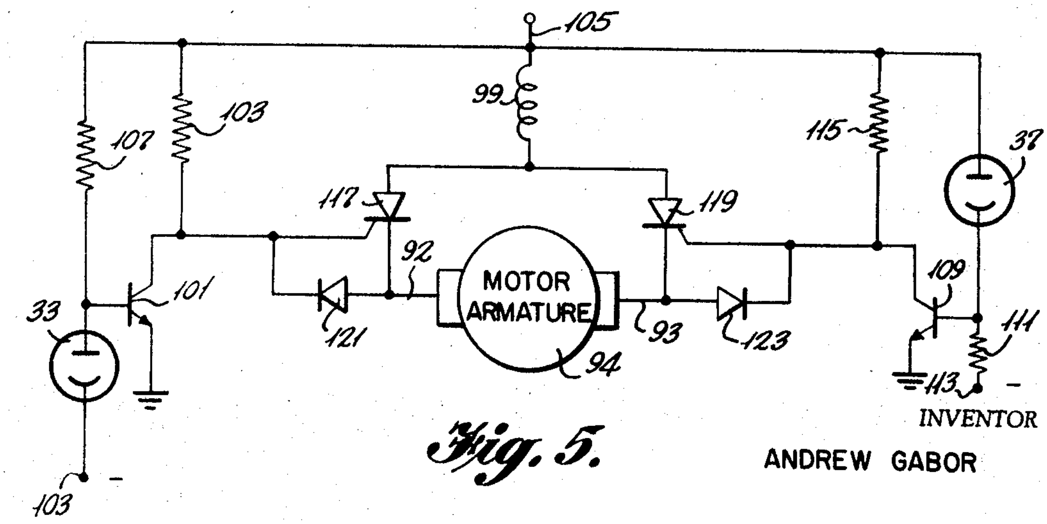
FIG. 5 is a circuit diagram of a motor control system in accordance with yet another embodiment of the invention.

The circuit of FIG. 5 like that of FIG. 3 is for controlling the motor of the type in which the field is excited in series with the armature. The circuit of FIG. 5 utilizes silicon controlled rectifiers to control the direction of current flow through the armature and is the same circuit as that of FIG. 4 except that the anodes of the silicon controlled rectifiers 117 and 119, instead of being directly connected to the pulsating source of positive DC voltage applied at terminal 105, are connected to this source of voltage through the field winding 99 of the motor.

As in the circuit of FIG. 4 when both the photocells 33 and 37 are irradiated calling for clockwise rotation, the silicon controlled rectifier 117 will be conducting and the transistor 109 will be conducting, whereas the silicon controlled rectifier 119 will be non-conducting and the transistor 101 will be non-conducting. Accordingly, current will flow from the terminal 105 through the field winding 99, through the silicon controlled rectifier 117, through the armature 94, through the diode 123, and through the transistor 109 to ground to drive the armature in a clockwise direction.

When neither of the photocells 33 or 37 is irradiated, the silicon controlled rectifier 119 will conduct and the transistor 101 will conduct, whereas the silicon controlled rectifier 117 will be cut off and the transistor 109 will be cut off. Accordingly current will flow from the terminal 105, through the field winding 99, through the silicon controlled rectifier 119, through the armature 94, through the diode 121, and through the transistor 101 to ground causing the motor to be driven in a counterclockwise direction.

When the photocell 37 is irradiated and the photocell 33 is not, both of the transistors 101 and 109 will conduct and one of the silicon controlled rectifiers 117 and 119 will conduct depending upon the direction of rotation of the armature. If the direction of rotation is clockwise the silicon controlled rectifier 119 will conduct and current will flow from the source 105, through the field winding 99, through the silicon controlled rectifier 119, through the armature 94, through the diode 121, and through the transistor 101 to ground to tend to drive the motor in a counterclockwise direction and thus bring the motor quickly to a stop. As in the case of FIG. 4 the silicon controlled rectifier 119 will remain conducting for only as long as the armature is rotating so there will be no overshoot.

When the motor is rotating in a counterclockwise direction, the back EMF will cause the silicon controlled rectifier 117 to turn on in a manner similar to that described with respect to FIG. 4 and current will flow through the field winding 99 and through the armature of the motor in the direction from the side 92 to the side 93. Thus the current flowing through the motor will tend to drive the motor in a clockwise direction and will quickly bring the motor to a stop. The silicon controlled rectifier 117 will only remain conducting for as long as the armature is generating back EMF and, as soon as the armature reaches zero speed, the silicon controlled rectifier will no longer conduct and current will no longer flow through the field winding 99 or through the armature.

As in the circuit of FIG. 4 during the braking operation, the voltage causing the current flow through the armature is not the back EMF generated by the armature alone but is also voltage applied externally at terminal 105 so that the motor is brought very quickly to a stop.

Thus the system of the present invention provides for driving of the tape reel in either direction or electrodynamically bringing the reel to a stop. In the embodiments of FIGS. 3 and 4 the electrodynamic stopping of the motor is carried out by actually applying current to the motor from an external source tending to drive the motor in the opposite direction from which it is turning, thus providing for very quick stopping of the motor.

The above description is of preferred embodiments of the invention and many modifications may be made thereto without departing from the spirit and scope of the invention, which is defined in the appended claims.

What is claimed is:

1. A motor control system comprising a DC motor, a source of DC power, first and second electron valves each having first and second output electrodes and a gate electrode, the voltage between the gate electrode and the second output electrode controlling the conductivity of the electron valve, circuit means controlling the first output electrodes of said first and second electron valves to said source of DC power and connecting the second output electrode of said first electron valve to one side of the armature of said motor and the second output electrode of said second electron valve to the other side of said armature, a first rectifying diode connected between said one side of said armature and the gate electrode of said first electron valve, and a second rectifying diode connected between the other side of said armature and the gate electrode of said second electron valve.

2. A motor control system as recited in claim 1 wherein said source of DC power is pulsating DC and wherein said electron valves are of the type which are rendered conductive by voltage applied between their second output electrodes and their gate electrodes and which are rendered non-conductive only by voltage applied between their output electrodes.

3. A motor control system as recited in claim 2 wherein said first and second electron valves comprise silicon controlled rectifiers.

4. A motor control system as recited in claim 1 wherein said circuit means connects the first output electrodes of said first and second electron valves to said source of DC power through a field winding of said motor.

5. A motor control system comprising a DC motor, a source of DC power, first and second electron valves each having first and second output electrodes and a gate electrode, the voltage between the gate electrode and the second output electrode controlling the conductivity of the electron valve, circuit means connecting the first output electrodes of said first and second electron valves to a source of DC power and connecting the second output electrode of said first electron valve to one side of the armature of said motor and the second output electrode of said second electron valve to the other side of said armature, electronic switch means to selectively apply either a first bias voltage or a second bias voltage to the gate electrode of said first electron valve, said first bias voltage having a value to render said first electron valve conductive when said armature is not rotating and said second bias voltage having a value to cause electron valve to be non-conductive when said armature is not rotating, electronic switch means to selectively apply either a third bias voltage or a fourth bias voltage to the gate electrode of said second electron valve, said third bias voltage having a value to render said second electron valve conductive when said armature is not rotating and said fourth bias voltage having a value to cause said second electron valve to be non-conductive when said armature is not rotating, rectifying means connected to one side of said armature operable to permit current flow in one direction between said one side of said armature and a reference voltage, and rectifying means connected to the other side of said armature operable to permit current flow in one direction between the other side of said armature and a reference voltage.

6. A motor control system as recited in claim 5 wherein said first rectifying means comprises a rectifying diode connected between said one side of said electron valve and the gate electrode of said first electron valve and said second rectifying means comprises a rectifying diode connected between said other side of said armature and the gate electrode of said second electron valve.

7. A motor control system as recited in claim 5 wherein said source of DC power is pulsating DC and wherein said electron valves are of the type that are rendered conductive by the voltage applied between their second output electrodes and their gate electrodes and which are rendered non-conductive only by the voltage applied between their output electrodes.

8. A motor control system as recited in claim 7 wherein said first and second electron valves comprise silicon controlled rectifiers.

9. A motor control system as recited in claim 5 wherein said circuit means connects the first output electrodes of said first and second electron valves to said source of DC power through a field winding of said DC motor.

10. A magnetic tape transport comprising: a tape processing station for processing information storage tape; a tape reel for winding, unwinding and storing information storage tape; means to feed information storage tape from said tape reel past said tape processing station; tape buffer storage means for storing a loop of said tap between said tape reel and said tape feeding means; a DC motor connected to drive said reel, said motor operating to drive said reel to feed tape into said tape buffer storage means in response to current flow in one direction and to drive said reel to withdraw tape from said buffer storage means in response to current flow in the opposite direction; a source of DC power; first and second electron valves each having first and second output electrodes and a gate electrode, the voltage between the gate electrode and the second output electrode controlling the conductivity of the electron valve; circuit means connecting the first output electrodes of said first and second electron valves to said source of DC power and connecting the second output electrode of said first electron valve to one side of the armature of said motor and the second output electrode of said second electron valve to the other side of said armature; rectifying means connected to said one side of said armature and operable to allow current flow in one direction between said one side of said armature and a reference voltage; second rectifying means connected to the other side of said armature and operable to allow current flow in one direction between said other side of said armature and a reference potential; and means responsive to the amount of tape in said buffer storage to apply bias voltages to the gate electrodes of said first and second electron valves having values that would render said first electron valve conductive and said second electron valve non-conductive when said armature is not turning in response to the amount of tape in said buffer storage being less than a first predetermined amount, to apply bias voltages to the gate electrodes of said first and second electron valves non-conductive when said armature is not turning in response to the amount of tape in said buffer storage being more than said first predetermined amount and less than a second predetermined amount, and to apply bias voltages to the gate electrodes of said first and second electron valves having values that would render said first electron valve non-conductive and said second electron valve conductive when the armature is not turning in response to the amount of tape in said buffer storage means being greater than said second predetermined amount.

11. An information storage tape transport comprising a tape processing station for processing information storage tape, a tape reel for winding, unwinding and storing information storage tape, means to feed information storage tape from said tape reel past said tape processing station, tape buffer storage means for storing a loop of said tape between said tape reel and said tape feeding means, a DC motor connected to drive said reel, said motor operating to drive said reel in the direction to feed tape into said tape buffer storage means in response to current flow in one direction to drive said reel in a direction to withdraw tape from said buffer storage means in response to current flow in the opposite direction, and circuit means responsive to the amount of tape in said buffer storage means to apply current in said one direction to said motor when the amount of tape in said buffer storage means is less than a first predetermined amount, to apply current in said opposite direction to said motor when the amount of tape in said buffer storage means is more than a second predetermined amount, and to electrodynamically brake said motor to a stop by applying power to said motor from a power source external to said motor to drive said motor in the opposite direction from which it is turning in response to the amount of tape in said buffer storage means being between said first and second predetermined amounts.

12. An information storage tape transport comprising a tape processing station for processing information storage tape, a tape reel for winding, unwinding and storing information storage tape, means to feed information storage tape past said tape processing station from said tape reel, a vacuum chamber for retaining a variable length loop of said tape between said tape reel and said tape feeding means, a DC motor connected to drive said reel, said motor operating to drive said reel in a first direction to feed tape into said vacuum chamber in response to current flow in one direction and to drive said reel in the opposite direction to withdraw tape from said vacuum chamber in response to current flow in the opposite direction, and circuit means responsive to the length of tape loop in said vacuum chamber to apply current in said one direction to said motor when the length of said loop in said vacuum chamber is less than a first predetermined amount, to apply current in said opposite direction to said motor when the length of said loop in said vacuum chamber is more than a second predetermined amount, and to connect said motor in a braking circuit when the length of said loop in said vacuum chamber is between said first and second predetermined amounts, said circuit means including switch means which becomes conductive to connect said motor in said braking circuit, said braking circuit electrodynamically braking said motor to a stop with power supplied entirely by the back EMF of said motor when said motor is connected in said braking circuit.

13. An information storage tape transport as recited in claim 12 wherein said circuit means includes electronic valves connected between said motor and a source of power to control the direction of current flow through said motor and wherein said switch means in said braking circuit comprises an electronic valve.

References Cited

UNITED STATES PATENTS

| | | | |
|---|---|---|---|
| 3,078,056 | 2/1963 | Alterman | 242—55.13 |
| 2,921,753 | 1/1960 | Lahti et al. | 242—55.12 |
| 3,318,545 | 5/1967 | Tobey | 242—55.12 |

LEONARD D. CHRISTIAN, Primary Examiner

U.S. Cl. X.R.

318—293

FO-1050
(5/69)

UNITED STATES PATENT OFFICE
CERTIFICATE OF CORRECTION

Patent No. 3,471,103 Dated October 7, 1969

Inventor(s) Andrew Gabor

It is certified that error appears in the above-identified patent and that said Letters Patent are hereby corrected as shown below:

Column 1, line 21, change "the" to --two--.

Column 4, line 3, change "means". to --mean--.

Column 11, line 46, change "tap" to --tape--.

Column 12, line 4, after "valves" insert --having values that would render said first and second electron valves--.

Signed and sealed this 20th day of April 1971.

(SEAL)
Attest:

EDWARD M.FLETCHER,JR.
Attesting Officer

WILLIAM E. SCHUYLER, JR.
Commissioner of Patents